(12) United States Patent
Hung et al.

(10) Patent No.: US 8,972,252 B2
(45) Date of Patent: Mar. 3, 2015

(54) SIGNAL PROCESSING APPARATUS HAVING VOICE ACTIVITY DETECTION UNIT AND RELATED SIGNAL PROCESSING METHODS

(75) Inventors: Chia-Yu Hung, Hsinchu County (TW); Tsung-Li Yeh, Hsinchu (TW); Yi-Chang Tu, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 189 days.

(21) Appl. No.: 13/615,515

(22) Filed: Sep. 13, 2012

(65) Prior Publication Data

US 2014/0012573 A1 Jan. 9, 2014

(30) Foreign Application Priority Data

Jul. 6, 2012 (TW) .............................. 101124391 A

(51) Int. Cl.
*G10L 19/00* (2013.01)
*G10L 21/00* (2013.01)

(52) U.S. Cl.
USPC .......................................... 704/230; 704/275

(58) Field of Classification Search
CPC ........ G10L 15/265; G10L 15/22; G10L 25/78
USPC .................. 704/231–257, 270–278
See application file for complete search history.

(56) References Cited

U.S. PATENT DOCUMENTS

| | | | | |
|---|---|---|---|---|
| 5,103,481 A | * | 4/1992 | Iseda et al. | 704/249 |
| 5,983,186 A | * | 11/1999 | Miyazawa et al. | 704/275 |
| 6,070,140 A | * | 5/2000 | Tran | 704/275 |
| 2003/0097261 A1 | * | 5/2003 | Jeon et al. | 704/233 |
| 2003/0171932 A1 | * | 9/2003 | Juang et al. | 704/276 |
| 2007/0057798 A1 | * | 3/2007 | Li et al. | 340/573.1 |
| 2009/0222258 A1 | | 9/2009 | Fukuda | |
| 2010/0268532 A1 | * | 10/2010 | Arakawa et al. | 704/214 |
| 2013/0246071 A1 | * | 9/2013 | Lee et al. | 704/275 |
| 2013/0339028 A1 | * | 12/2013 | Rosner et al. | 704/275 |

FOREIGN PATENT DOCUMENTS

| | | |
|---|---|---|
| GB | 2499781 A | 9/2013 |
| WO | 2010048635 | 4/2010 |

* cited by examiner

*Primary Examiner* — Samuel G Neway
(74) *Attorney, Agent, or Firm* — Winston Hsu; Scott Margo

(57) ABSTRACT

A signal processing apparatus includes a speech recognition system and a voice activity detection unit. The voice activity detection unit is coupled to the speech recognition system, and arranged for detecting whether an audio signal is a voice signal and accordingly generating a voice activity detection result to the speech recognition system to control whether the speech recognition system should perform speech recognition upon the audio signal.

18 Claims, 7 Drawing Sheets

SIGNAL PROCESSING APPARATUS HAVING VOICE ACTIVITY DETECTION UNIT AND RELATED SIGNAL PROCESSING METHODS

BACKGROUND OF THE INVENTION

1. Field of the Invention

The disclosure relates to a signal processing apparatus and method.

2. Description of the Prior Art

In the voice command function, the core task is to recognize the audio signal recorded before executing a command, and after the command is recognized determine the corresponding action to be taken by a system (e.g., a computer system) based on the recognized command. For example, when the system obtains a command of opening the web browser through the speech recognition, the system will open the web browser correspondingly. In another case, if the system is in the power saving mode (e.g., the sleeping status), and a wake-up command of waking up the system is derived from the speech recognition, the system will leave the power saving mode (e.g., the sleeping status) and return to the normal mode (e.g., the normal operation status).

In order to perform the system speech recognition without missing any key voice signal, the system may keep receiving the audio signal by a microphone, and keep recognizing the digitalized signals recorded. However, the process of receiving the audio signal often makes the recorded signal to be recognized contain too many none-voice durations.

The task of speech recognition is generally performed by software programs. If the audio signal received by the microphone is continuously sent to the speech recognition system for calculation, but no key voice signal occurs in the duration of receiving the audio signals, this will lead to unnecessary waste of power, and thus fail to follow the power saving trend. Consequently, if the speech recognition system is located in a mobile device, the battery life will be shortened.

Traditionally, to avoid the additional power waste due to keeping performing the speech recognition or save the temporary storage space needed before speech recognition starts, the user may be required to transmit/trigger a voice starting command in a manual manner (for example, key pressing) before using the speech recognition, and transmit a voice ending command in a manual manner (for example, key pressing) after entering the audio input. Therefore, the speech recognition system only needs to recognize the audio signal present in the duration between the voice starting command and the voice ending command.

However, because the user needs to enable and disable the speech recognition manually, the user therefore needs to touch the system key by himself/herself to enable and disable the speech recognition well. Hence, such a control mechanism of speech recognition is not very convenient for users. Moreover, when the aforementioned speech recognition mechanism is applied to the voice wake-up function of the system, the voice starting command and the voice ending command may not be triggered because the user can not touch the key of the system directly for some design models. Thus, the only way to provide the voice wake-up function is to keep receiving audio signal, recording the audio signal, and performing the speech recognition. This mechanism for voice wake-up function fails to achieve the purpose of saving power.

SUMMARY OF THE INVENTION

One objective of the disclosure is to provide a signal processing apparatus for controlling whether a speech recognition system recognizes an audio signal through a speech recognition unit and related signal processing method therefore, to solve the problem mentioned above.

In an exemplary embodiment, a signal processing apparatus is disclosed. The signal processing apparatus includes a speech recognition system and a voice activity detection unit. The voice activity detection unit is coupled to the speech recognition system, arranged for detecting whether an audio signal is a voice signal, and outputting a voice activity detection result to the speech recognition system to control the speech recognition system to perform speech recognition.

In another exemplary embodiment, a signal processing method is disclosed. The signal processing method comprises: detecting whether an audio signal is a voice signal, and generating a voice activity detection result; and controlling a speech recognition system to recognize the voice signal according to the voice activity detection result.

The disclosure employs the voice activity detection unit for predetermining purposes to pick out the part that can not be the voice signal. In the duration that the part is already determined as a non-voice signal, the system is allowed to stop the speech recognition. In the duration that the voice activity detection unit detects that the audio signal may be the voice signal, speech recognition is needed to be performed through the speech recognition system for determining the following action of the system. Therefore, in a case where the speech recognition control mechanism of the disclosure is applied to the voice wake-up function of the system, the voice activity detection unit could be enabled to detect whether the received audio signal is a voice signal when the system is in the power saving mode (i.e., the sleeping status). If the audio signal recorded by the voice activity detection unit is not a voice signal, the system will remain in the power saving mode (i.e., the sleeping status). On the other hand, if the voice activity detection unit determines that the recorded audio signal is a voice signal, the speech recognition system will be enabled to determine whether the recorded audio signal contains a wake-up command of the system. The voice activity detection unit can be implemented with simple architecture. Thus, even though the voice activity detection unit is consistently enabled, the efficiency of power saving of the system will not be affected. In addition, because the voice activity detection unit can pick out and remove the duration in which there is no voice signal present, the unnecessary waste of power of the speech recognition system can be avoided, thus achieving the purpose of power saving. Additionally, because the user doesn't need to manually mark the beginning and the ending of the voice duration, even though the user can not touch the key of the system directly, the voice wake-up functionality can be achieved through the help of the voice activity detection unit.

These and other objectives of the present invention will no doubt become obvious to those of ordinary skill in the art after reading the following detailed description of the preferred embodiment that is illustrated in the various figures and drawings.

DETAILED DESCRIPTION

The main concept of the disclosure is to integrate the voice activity detection and the speech recognition. Therefore, a voice activity detection unit will estimate whether the recorded audio signal is a voice signal through continuous calculation and determination according to the characteristic of the recorded audio signal. Besides, the speech recognition system will determine whether to perform speech recognition on the recorded audio signal according to the determination result of the voice activity detection unit. Because the voice activity detection can filter out the duration in which no voice signal is present, the unnecessary waste of power of the speech recognition system can be avoided, thus achieving the purpose of power saving. Further details will be described in the following.

Figure 1:
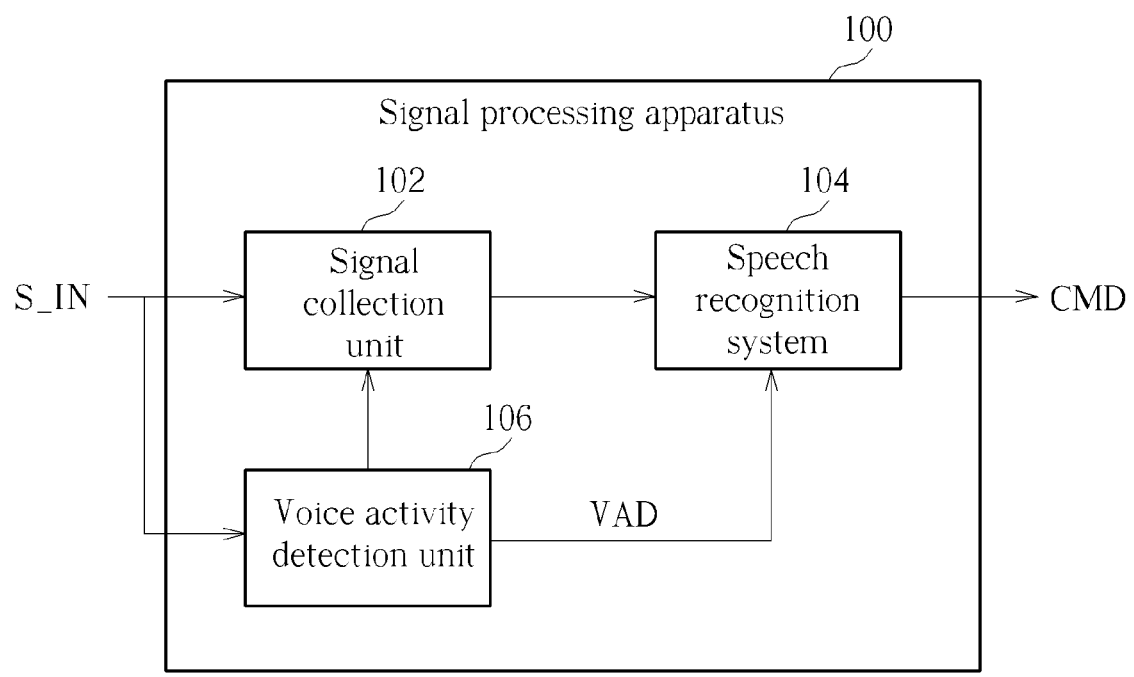
FIG. 1 is a block diagram illustrating the signal processing apparatus of an exemplary embodiment.

Please refer to FIG. 1, which is a block diagram illustrating a signal processing apparatus in an exemplary embodiment. The signal processing apparatus 100 includes a signal collection unit 102, a speech recognition system 104 and a voice activity detection unit 106, wherein the voice activity detection unit 106 is coupled to signal collection unit 102 and speech recognition system 104, and the signal collection unit 102 is coupled to the speech recognition 104. In one exemplary implementation, the signal collection unit 102, the speech recognition system 104 and the voice activity detection unit 106 are all implemented with hardware. Hence, the operation statuses of the signal collection unit 102, the speech recognition system 104 and the voice activity detection 106 can be controlled, respectively. In this way, better power saving performance is achieved. However, this is for illustrative purposes only, and is not meant to be a limitation to the disclosure. For example, any implementation employing the voice activity detection disclosed by the disclosure to assist the speech recognition operation would fall within the scope of the disclosure.

In the first application (e.g., a voice wake-up function) of the disclosure, only when the signal collection unit 102 and the speech recognition system 104 are both in a power saving mode (e.g., a sleeping status), the voice activity detection unit 106 will be enabled. If the signal collection unit 102 and the speech recognition system 104 leave a normal mode and enter a power saving mode because of a turn-off command or sleep command, the voice activity detection unit 106 will be enabled and start performing the operation of voice activity detection. An audio signal S_IN is inputted to the voice activity detection unit 106, and the voice activity detection unit 106 will detect whether the audio signal S_IN is a voice signal, and output a voice activity detection result VAD to the speech recognition system 104. The voice activity detection result VAD can act as an enabling signal of the speech recognition system. For example, when the voice activity detection unit 106 determines that the audio signal S_IN is not a voice signal, VAD=0. Correspondingly, the speech recognition system 104 remains in the power saving mode. When the voice activity detection unit 106 determines that the audio signal S_IN is a voice signal, VAD=1. Correspondingly, the speech recognition system 104 leaves the power saving mode and returns to the normal mode. Additionally, the voice activity detection result VAD can also control whether the signal collection unit 102 leaves the power saving mode and returns to the normal mode. This helps signal collection unit 102 not only to save power, but also to reduce the storage spaces for signal recording. With the help of the voice activity detection result VAD, only when the voice activity detection unit 106 determines that the audio signal S_IN is a voice signal, the speech recognition system 104 is operative to perform the speech recognition on the audio signal S_IN recorded by the signal collection unit 102. Because the speech recognition system 104 would turn off a lot of internal circuits in the power saving mode, the purpose of power saving is achieved.

On the other hand, when the speech recognition system 104 performs speech recognition on the audio signal S_IN and determines that the audio signal S_IN carries a predetermined command information CMD (e.g., a wake-up command of the system), the speech recognition system 104 will output the predetermined command information CMD (e.g., the wake-up command of the system) to the backend system. For example, the signal processing apparatus 100 is a part of an application device, and the speech recognition system 104 can output the predetermined command information CMD (e.g., the wake-up command of the system) to a controller (e.g., a processor) of the application device. Therefore, the controller of the application device will perform the corresponding operation (e.g., making the application device turned on or operated at full speed) based on the received predetermined command information CMD (e.g., the wake-up command of the system). On the other hand, if the speech recognition system 104 determines that the audio signal S_IN does not carry any predetermined command information CMD (e.g., the wake-up command of the system), this means that the voice activity detection unit 106 may mistake the current non-voice audio signal S_IN as a voice signal, or the current audio signal S_IN is a voice signal but has no voice command related to waking up the system. Hence, the signal collection unit 102 and the speech recognition system 104 will enter the power saving mode quickly again to save the power efficiently.

Figure 2:
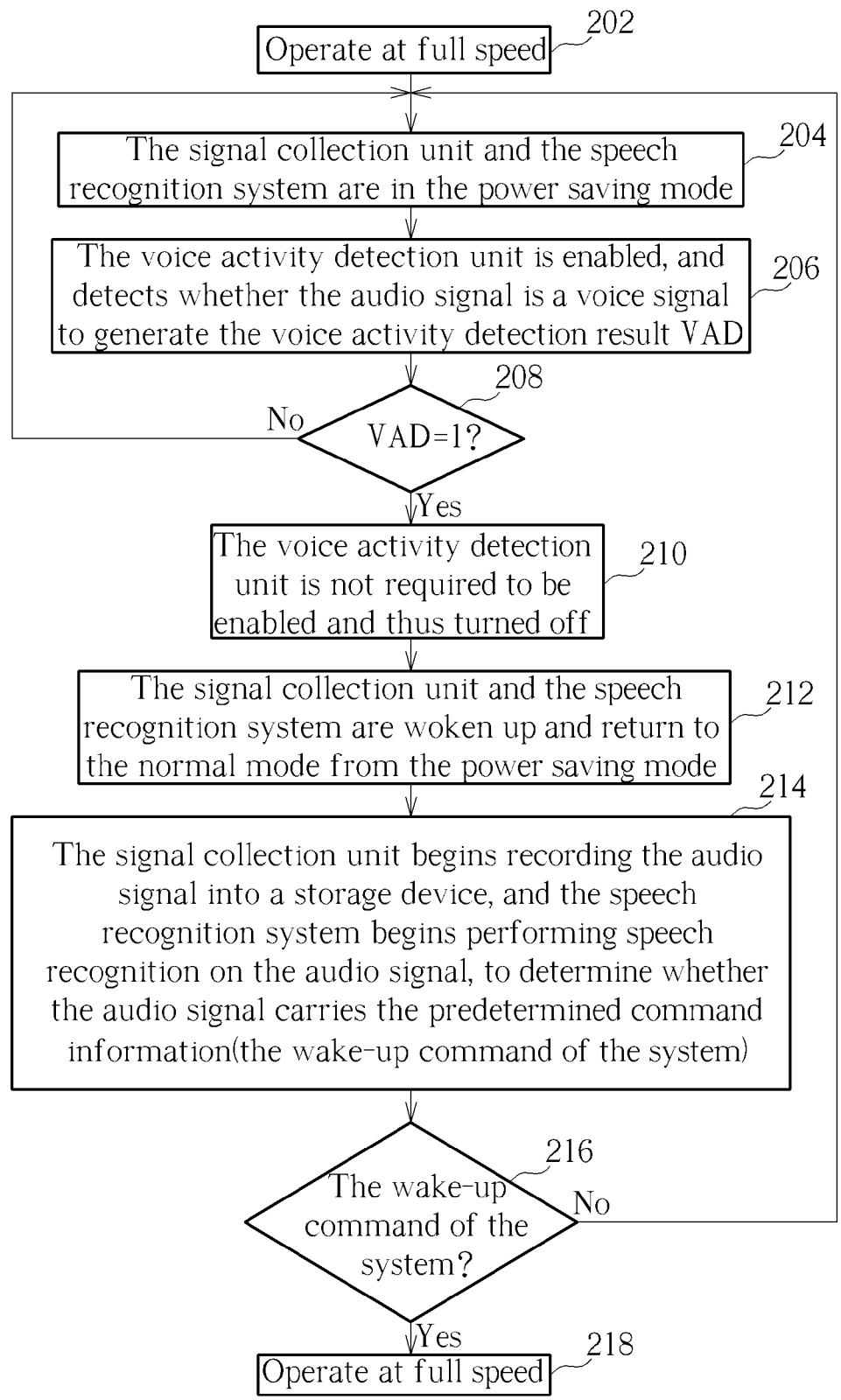
FIG. 2 is a flowchart of the exemplary operation of the signal processing apparatus shown in FIG. 1 that is employed in the first application (e.g., the voice wake-up function).

Please refer to FIG. 1 and FIG. 2 together. FIG. 2 is a flowchart of an exemplary operation of the signal processing apparatus shown in FIG. 1 employed in the first application (e.g., the voice wake-up function). If the results are substantially the same, the steps need not be performed in the exact order shown in FIG. 2. The signal processing method employed by the signal processing apparatus 100 in FIG. 1 may be briefly summarized as follows.

Step 202: The application device employing the signal processing apparatus 100 operates at full speed. At this moment, the signal collection unit 102 and the speech recognition system 104 are both in the normal mode, and the voice activity detection unit 106 is not enabled.

Step 204: The signal collection unit 102 and the speech recognition system 104 enter the power saving mode.

Step 206: The voice activity detection unit is enabled, and detects whether the audio signal S_IN is a voice signal to generate the voice activity detection result VAD.

Step 208: Check if the voice activity detection result VAD indicates that the audio signal S_IN is a voice signal (i.e., VAD=1). If yes, go to Step 210; if no, go back to Step 204, so the signal collection unit 102 and the speech recognition system 104 remain in the power saving mode (Step 204), and the voice activity detection unit 106 keeps detecting whether the audio signal S_IN is a voice signal (Step 206).

Step 210: The voice activity detection unit 106 is not required to be enabled for now and thus can be turned off.

Step 212: The signal collection unit 102 and the speech recognition system 104 are woken up and return to the normal mode from the power saving mode.

Step 214: The signal collection unit 102 begins recording the audio signal S_IN into a storage device (e.g., a memory), for example, by writing the received audio signal S_IN into the storage device through direct memory access (DMA), and the speech recognition system 104 begins performing speech recognition on the audio signal S_IN recorded by the signal collection unit 102, to determine whether the audio signal S_IN carries the predetermined command information CMD (e.g., the wake-up command of the system).

Step 216: Check if the audio signal S_IN carries the predetermined command information CMD (e.g., the wake-up command of the system). If yes, go to Step 218; if no, go back to Step 204, so the signal collection unit 102 and the speech recognition system 104 will enter the power saving mode (Step 204) again, and the voice activity detection unit 106 will be enabled again to detect whether the audio signal S_IN is a voice signal (Step 206).

Step 218: The application device operates at full speed based on the predetermined command information CMD (e.g., the wake-up command of the system).

Because those skilled can easily understand details of each step based on the related description mentioned above, further description is omitted for brevity.

In the second application of the disclosure, when the signal collection unit 102 and the speech recognition system 104 are both in a normal mode (e.g., the normal operation status), the voice activity detection unit 106 would also be enabled. The audio signal S_IN would be inputted to the voice activity detection unit 106 and the signal collection unit 102. Therefore, the signal collection unit 102 would store the audio signal S_IN for speech recognition performed by the speech recognition system 104. At the same time, the voice activity detection unit 106 would detect whether the audio signal S_IN is a voice signal, and generate the voice activity detection result VAD to the speech recognition system 104. The voice activity detection result VAD can act as a control signal that controls whether the speech recognition system 104 performs the speech recognition. For example, when the voice activity detection unit 106 determines that the audio signal S_IN is not a voice signal (i.e., VAD=0), the speech recognition system 104 will not perform speech recognition on the audio signal S_IN. Though the speech recognition system 104 operates in the normal mode and does not turn off the internal circuits, because the speech recognition system 104 does not perform the speech recognition on the audio signal S_IN, the speech recognition system 104 only has the minimum power consumption, and the purpose of power saving is also achieved. On the other hand, when the voice activity detection unit 106 determines that the audio signal S_IN is a voice signal (i.e., VAD=1), the speech recognition system 104 will perform speech recognition on the audio signal S_IN. To put it simply, only when the voice activity detection unit 106 determines that the audio signal S_IN is a voice signal, the speech recognition system 104 in the normal mode will perform speech recognition on the audio signal S_IN recorded by signal collection unit 102, and determine whether the audio signal S_IN carries the predetermined command information CMD (e.g., a command of opening the web browser or control command(s) of other application program(s)), thus achieving the purpose of power saving.

Figure 3:
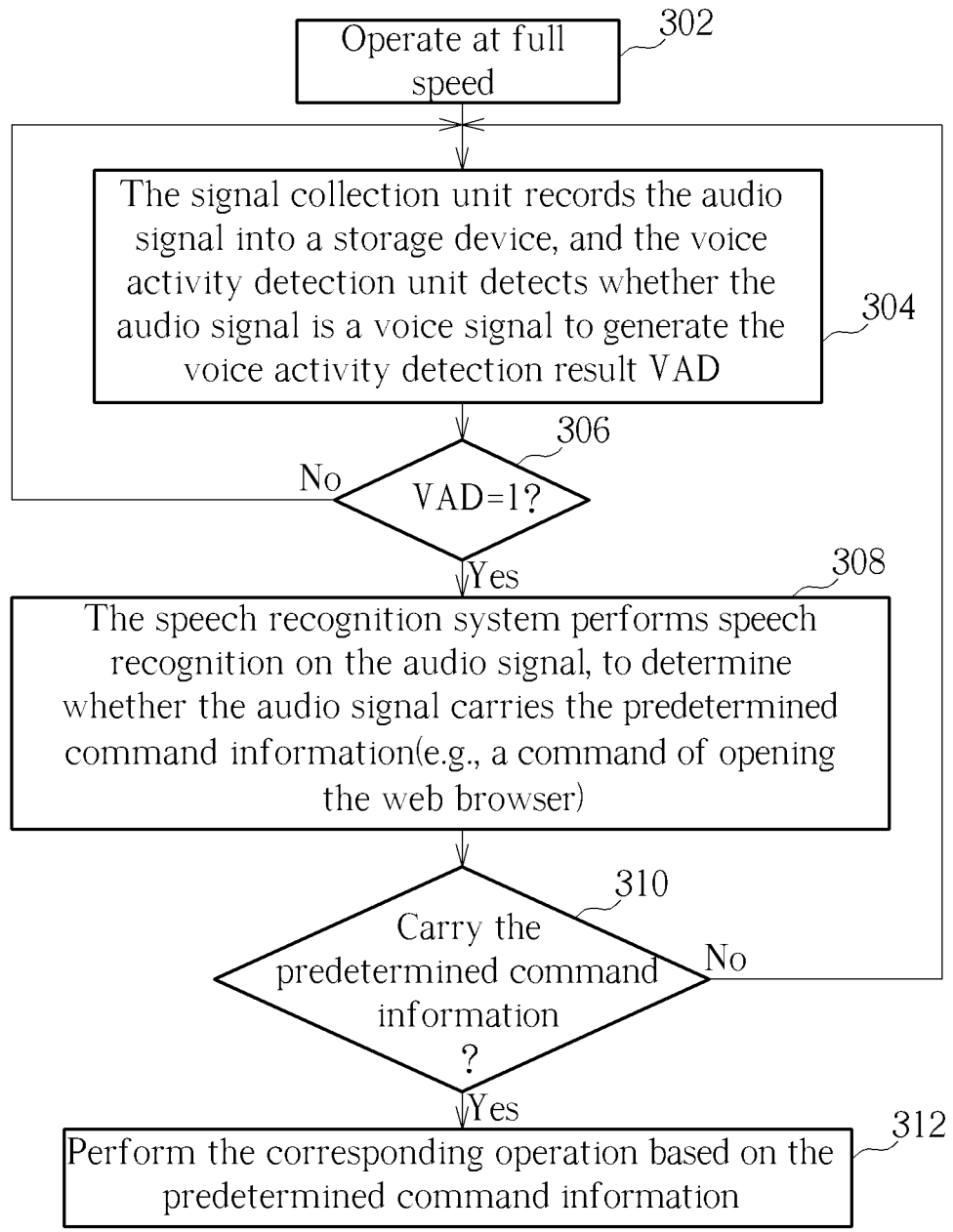
FIG. 3 is a flowchart of the exemplary operation of the signal processing apparatus shown in FIG. 1 that is employed in the second application.

Please refer to FIG. 1 and FIG. 3 together. FIG. 3 is a flowchart of the exemplary operation of the signal processing apparatus shown in FIG. 1 employed in the second application. If the results are substantially the same, the steps need not be performed in the same order shown in FIG. 3. The signal processing method employed by the signal processing apparatus 100 in FIG. 1 may be briefly summarized as follows.

Step 302: The application device employing the signal processing apparatus 100 operates at full speed. At this moment, the signal collection unit 102 and the speech recognition system 104 are both in the normal mode, and the voice activity detection unit 106 is enabled.

Step 304: The signal collection unit 102 records the audio signal S_IN into a storage device (e.g., a memory), for example, by writing the received audio signal S_IN into the storage device through direct memory access (DMA), and the voice activity detection unit 106 detects whether the audio signal S_IN is a voice signal to generate the voice activity detection result VAD.

Step 306: Check if the voice activity detection result VAD indicates that the audio signal VAD is a voice signal (i.e., VAD=1). If yes, go to Step 308; if no, go back to Step 304.

Step 308: The speech recognition system 104 performs speech recognition on the audio signal S_IN recorded by the signal collection unit 102, to determine whether the audio signal S_IN carries the predetermined command information CMD (e.g., a command of opening the web browser).

Step 310: Check if the audio signal S_IN carries the predetermined command information CMD (e.g., a command of opening the web browser or control command(s) of other application program(s)). If yes, go to Step 312; if not, go back to Step 304.

Step 312: The application device performs the corresponding operation based on the predetermined command information CMD (e.g., a command of opening the web browser or control command(s) of other application program(s)).

Because those skilled can easily understand details of each step based on the related description mentioned above, further description is omitted for brevity.

As mentioned above, the voice activity detection unit 106 is used to detect whether the audio signal is a voice signal by analyzing some estimated audio characteristics. The estimated audio characteristics may include the over-zero rate in a unit frame time, the average energy in a unit frame time, the peak value of the amplitude in a unit frame time and within a frequency range, and/or the envelope of frequency spectrum obtained from the linear prediction (LP) of the frequency spectrum.

In the embodiment, the voice activity detection unit 106 may use one or more determination criteria to determine the voice activity detection result VAD. For example, the voice activity detection unit 106 may employ any combination of the following determination criteria to determine whether the voice activity detection result VAD is 1 or 0:

Determination criterion (1): The audio signal S_IN includes a current audio frame, and the voice activity detection unit 106 compares the average energy EV_C with a threshold value TH1;

Determination criterion (2): The audio signal S_IN contains at least one previous audio frame and a current audio frame, and the voice activity detection unit 106 determines a trend value of signal energy EV_T according to the average energy of the at least one previous audio frame, calculates a difference D1 between the average energy EV_C and the trend value of signal energy EV_T (that is, D1=|EV_C−EV_P|), and compares the difference D1 with a threshold value TH2;

Determination criterion (3): The audio signal S_IN includes a plurality of audio frames, and the voice activity detection unit 106 compares a threshold value TH3 with the number N of successive audio frames determined as not including the voice signal in the plurality of audio frames; and Determination criterion (4): The audio signal S_IN includes a previous audio frame and a current audio frame, and the voice activity unit 106 calculates a difference D2 between the average energy EV_C of the current audio frame and the average energy EV_P of the previous audio frame (that is, D2=|EV_C−EV_P|), and compares the difference D2 with a threshold value TH4.

Figure 4:
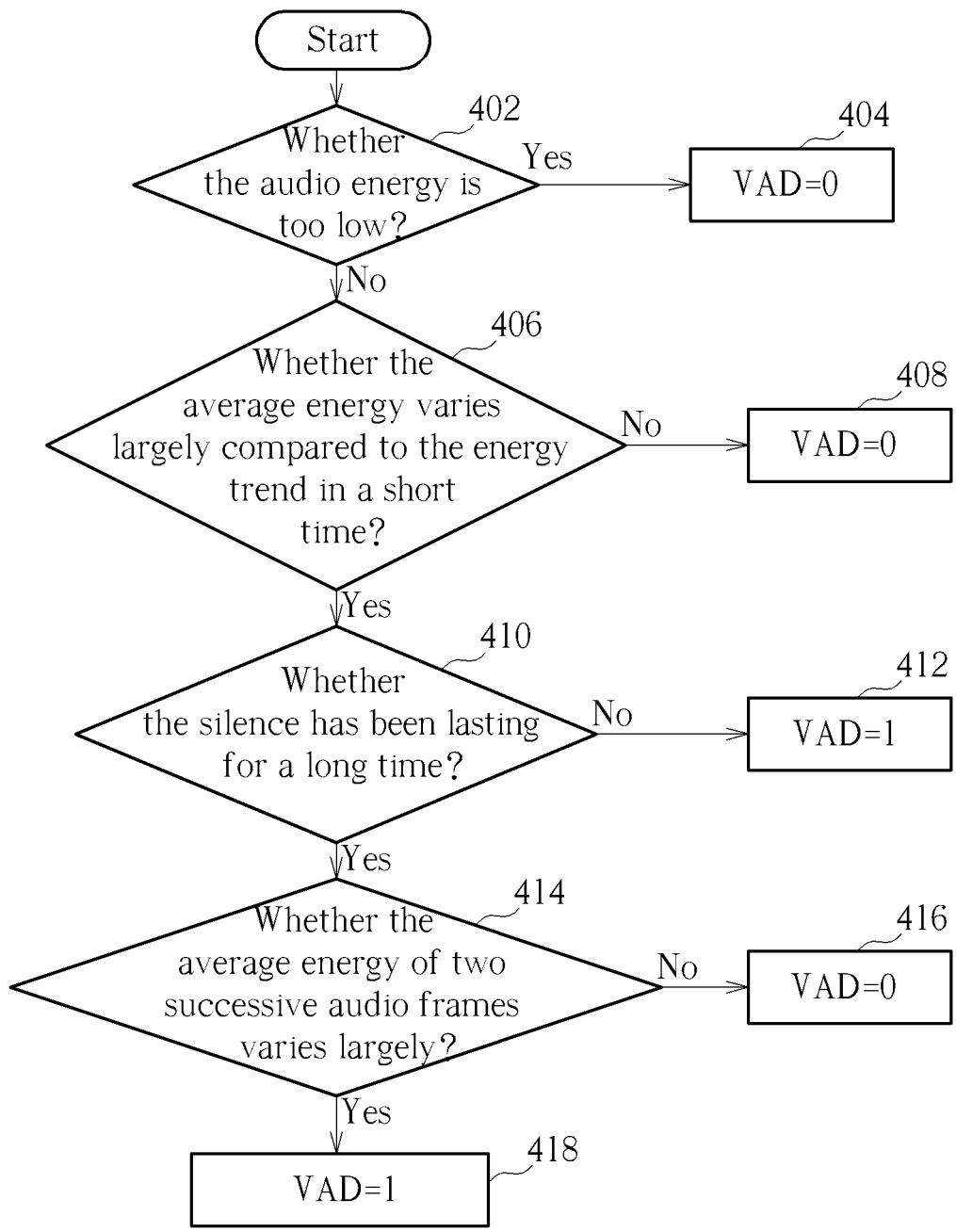
FIG. 4 is a flowchart of a first embodiment of an operation of determining the voice activity detection result by using the voice activity detection unit shown in FIG. 1.

Please refer to FIG. 4, which is a flowchart of a first embodiment of an operation of determining the voice activity detection result VAD by using the voice activity detection unit 106 shown in FIG. 1. If the results are substantially the same, the steps need not be performed in the same order shown in FIG. 4. The operation of determining the voice activity detection result VAD by using the voice activity detection unit 106 is described in the following.

Step 402: Check determination criterion (1) to determine whether the average energy EV_C of the current audio frames is smaller than the threshold value TH1 (that is, EV_C<TH1) to detect whether the audio energy is too low. If yes, go to Step 404; if no, go to Step 406;

Step 404: Because the audio energy is too low, it is determined that the current audio frame can not be a voice signal, so VAD=0.

Step 406: Check determination criterion (2) to determine whether the difference D1 is smaller than the threshold value TH2 (that is, D1<TH2) to detect whether the average energy varies largely enough compared to the energy trend in a short time. If yes, go to Step 410; if no, go to Step 408;

Step 408: Because there is no obvious difference between the average energy EV_C of the current audio frame and the energy trend of signal in a short time, it is determined that the current audio frame can not be a voice signal, so VAD=0.

Step 410: Check determination criterion (3) to determine whether the number N is larger than the threshold value TH3 (that is, N>TH3) to detect whether the silence has been lasting for a long time. If yes, go to Step 414; if no, go to Step 412.

Step 412: Because the silence has not been lasting for a long time, it is determined that the current audio frame is a voice signal, so VAD=1.

Step 414: Check determination criterion (4) to determine whether the difference D2 is larger than the threshold value TH4 (that is, D2>TH4) to detect whether the average energy of two successive audio frames varies largely. If yes, go to Step 418; if no, go to Step 416.

Step 416: Because the average energy of the two successive audio frames does not vary largely, it is determined that the current audio frame is not a voice signal, so VAD=0.

Step 418: Because the average energy of the two successive audio frames varies largely, it is determined that the current audio frame is a voice signal, so VAD=1.

Please note that, the checking order of determination criteria (1)-(4) in the flowchart shown in FIG. 4 is for illustrative purposes only, and is not meant to be a limitation to the disclosure. In other alternative designs, different checking orders of determination criteria (1)-(4) may be employed. Additionally, it is not required to employ all of the determination criteria (1)-4) to design the flowchart of determining the voice activity detection result VAD. In other words, any implementation using any one of the determination criteria (1)-(4) would fall within the scope of the disclosure.

Figure 5:
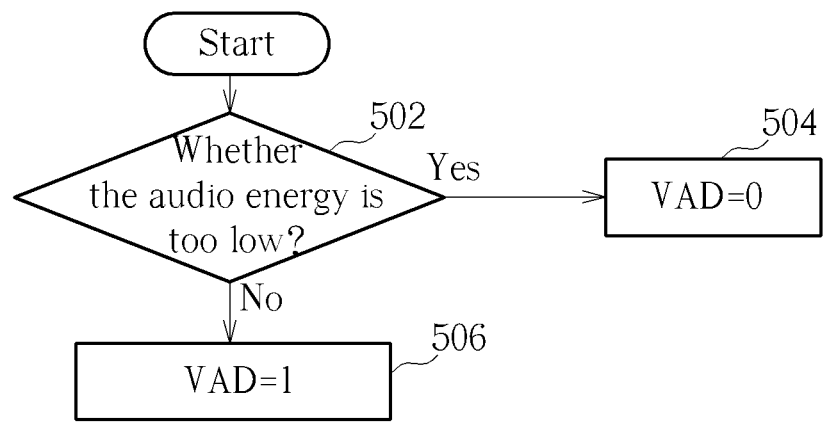
FIG. 5 is a flowchart of a second embodiment of an operation of determining the voice activity detection result by using the voice activity detection unit shown in FIG. 1.

FIG. 5 is a flowchart of a second embodiment of an operation of determining the voice activity detection result VAD by using the voice activity detection unit 106 shown in FIG. 1. If the audio energy is too low, n VAD=0 (Steps 502 and 504); otherwise, VAD=1 (Steps 502 and 506).

Figure 6:
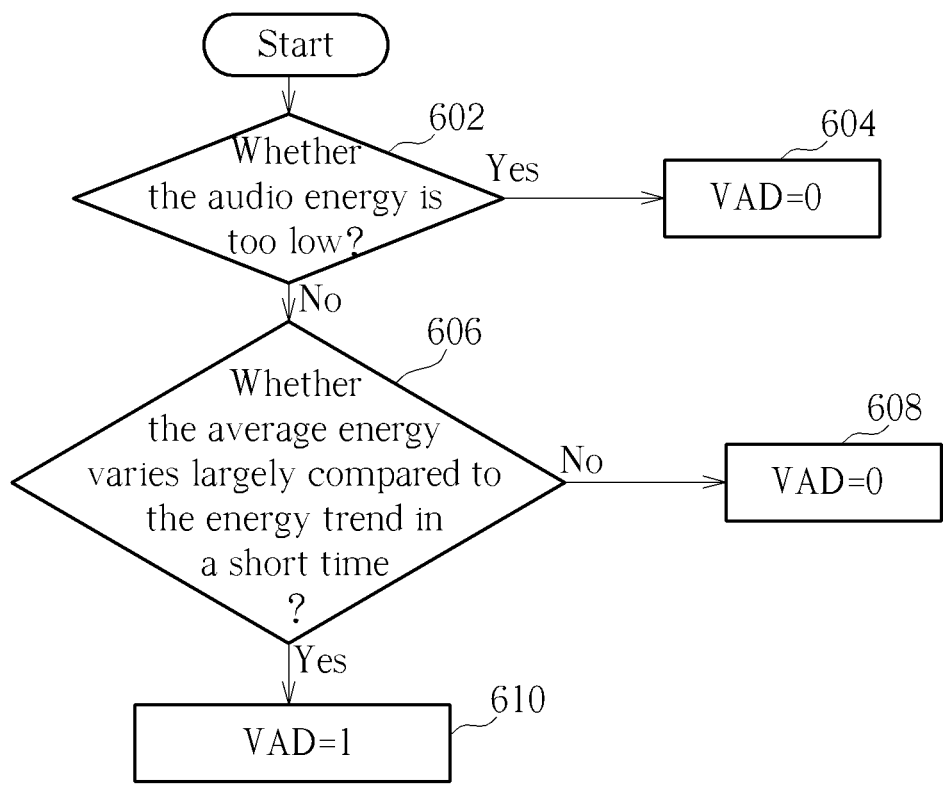
FIG. 6 is a flowchart of a third embodiment of an operation of determining the voice activity detection result by using the voice activity detection unit shown in FIG. 1.

FIG. 6 is a flowchart of a third embodiment of an operation of determining the voice activity detection result VAD by using the voice activity detection unit 106 shown in FIG. 1. If the audio energy is too low, VAD=0 (Steps 602, 606 and 608); if the audio energy is high enough and the average energy varies largely, VAD=1 (Steps 602, 606 and 610).

Figure 7:
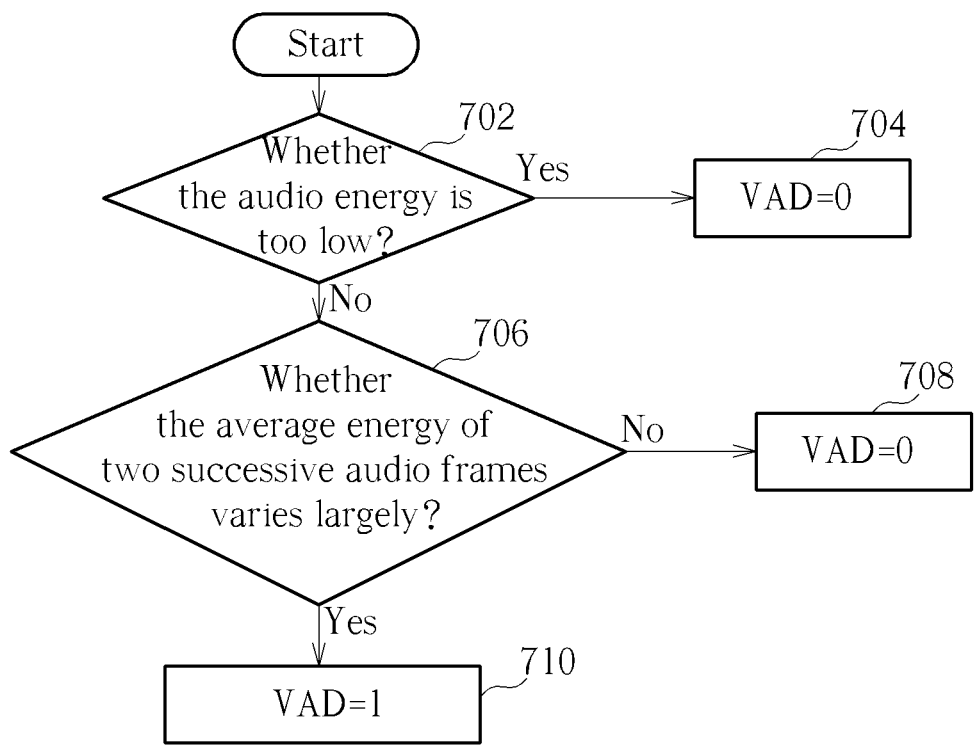
FIG. 7 is a flowchart of a fourth embodiment of an operation of determining the voice activity detection result by using the voice activity detection unit shown in FIG. 1.

FIG. 7 is a flowchart of a fourth embodiment of an operation of determining the voice activity detection result VAD by using the voice activity detection unit 106 shown in FIG. 1. If the audio energy is too low, VAD=0 (Steps 702 and 704); if the audio energy is high enough, but the average energy does not vary largely, VAD=0 (Steps 702, 706 and 708); if the audio energy is high enough, and the average energy of two successive audio frames varies largely, VAD=1 (Steps 702, 706 and 710).

Because those skilled can easily understand details of each step in FIG. 5-FIG. 7 based on the related description directed to the aforementioned flowchart shown in FIG. 4, further description is omitted for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing apparatus, comprising:
a speech recognition system; and
a voice activity detection unit, coupled to the speech recognition system, the voice activity detection unit arranged for detecting whether an audio signal is a voice signal or not, and outputting a voice activity detection result to the speech recognition system to control whether the speech recognition system should perform speech recognition upon the audio signal;
wherein only when the speech recognition system enters a power saving mode from a normal mode, the voice activity detection unit is enabled; and when the speech recognition system is in the normal mode, the voice activity detection unit is disabled.

2. The signal processing apparatus of claim 1, wherein when the voice activity detection unit detects that the audio signal is the voice signal, the speech recognition system performs speech recognition upon the audio signal, and when the voice activity detection unit detects that the audio signal is not the voice signal, the speech recognition system does not perform speech recognition upon the audio signal.

3. The signal processing apparatus of claim 1, wherein when the voice activity detection unit detects that the audio signal is a voice signal, the speech recognition system leaves the power saving mode, and enters the normal mode to perform speech recognition upon the audio signal.

4. The signal processing apparatus of claim 3, wherein the speech recognition system performs speech recognition upon the audio signal to determine whether the audio signal contains a predetermined command information; and when the speech recognition system determines that the audio signal does not contain the predetermined command information, the speech recognition system leaves the normal mode and enters the power saving mode.

5. The signal processing apparatus of claim 4, wherein the predetermined command information is a system wake-up command.

6. The signal processing apparatus of claim 1, wherein the audio signal comprises a current audio frame, and the voice activity detection unit is arranged to compare an average power of the current audio frame with a threshold value.

7. The signal processing apparatus of claim 1, wherein the audio signal comprises a current audio frame and at least one previous audio frame, and the voice activity detection unit is arranged to determine a signal power trend value according to an average power of the at least one previous audio frame, calculate a difference between an average power of the current audio frame and the signal power trend value, and compare the difference with a threshold value.

8. The signal processing apparatus of claim 1, wherein the audio signal comprises a plurality of audio frames, and the voice activity detection unit is arranged to compare a number of successive audio frames, determined as not containing the audio signal, with a threshold value.

9. The signal processing apparatus of claim 1, wherein the audio signal comprises a previous audio frame and a current audio frame, and the voice activity unit is arranged to calculate a difference between an average power of the current audio frame and an average power of the previous audio frame, and compare the difference with a threshold value.

10. A signal processing method, comprising:
    detecting whether an audio signal is a voice signal or not, and outputting a voice activity detection result to a speech recognition system to control whether the speech recognition system should perform speech recognition upon the audio signal;
    wherein the steps of detecting whether the audio signal is the voice signal are performed only when the speech recognition system enters a power saving mode from a normal mode; and the steps of detecting whether the audio signal is the voice signal are not performed when the speech recognition system is in the normal mode.

11. The signal processing method of claim 10, wherein the steps of controlling the speech recognition system to recognize the audio signal according to the voice activity detection result comprise:
    when detecting that the audio signal is the voice signal, the speech recognition system performs speech recognition upon the audio signal; and
    when detecting that the audio signal is not the voice signal, the speech recognition system does not perform speech recognition upon the audio signal.

12. The signal processing method of claim 10, wherein the steps of controlling the speech recognition system to recognize the audio signal according to the voice activity detection result comprise:
    when detecting that the audio signal is the voice signal, the speech recognition system leaves the power saving mode, and enters the normal mode to perform speech recognition upon the audio signal.

13. The signal processing method of claim 12, wherein the speech recognition system performs speech recognition upon the audio signal to determine whether the audio signal contains a predetermined command information, and the signal processing method further comprises:
    when the speech recognition system determines that the audio signal does not contain the predetermined command information, the speech recognition system leaves the normal mode and enters the power saving mode.

14. The signal processing method of claim 13, wherein the predetermined command information is a system wake-up command.

15. The signal processing method of claim 10, wherein the audio signal comprises a current audio frame, and the voice activity detection unit is arranged to compare an average power of the current audio frame with a threshold value.

16. The signal processing method of claim 10, wherein the audio signal comprises a current audio frame and at least one previous audio frame, and the steps of detecting whether the audio signal is the voice signal comprise:
    determining a signal power trend value according to an average power of the at least one previous audio frame;
    calculating a difference between an average power of the current audio frame and the signal power trend value; and
    comparing the difference with a threshold value.

17. The signal processing method of claim 10, wherein the audio signal comprises a plurality of audio frames, and the steps of detecting whether the audio signal is the voice signal comprise:
    comparing a number of successive audio frames, determined as not containing the audio signal, with a threshold value.

18. The signal processing method of claim 10, wherein the audio signal comprises a previous audio frame and a current audio frame, and the steps of detecting whether the audio signal is the voice signal comprise:
    calculating a difference between an average power of the current audio frame and an average power of the previous audio frame; and
    comparing the difference with a threshold value.

* * * * *